United States Patent
Warren et al.

(10) Patent No.: US 9,830,579 B2
(45) Date of Patent: Nov. 28, 2017

(54) METHODS FOR PROVIDING NOTIFICATIONS FOR FOLLOW-UP ACTIONS IN RESPONSE TO EVENTS DETECTED BY AN AUTOMATION SYSTEM, AND SYSTEMS AND DEVICES RELATED THERETO

(71) Applicant: Vivint, Inc., Provo, UT (US)

(72) Inventors: Jeremy B. Warren, Draper, UT (US); Todd Matthew Santiago, Orem, UT (US); Jeffrey G. Thomas, Draper, UT (US)

(73) Assignee: Vivint, Inc., Provo, UT (US)

( * ) Notice: Subject to any disclaimer, the term of this patent is extended or adjusted under 35 U.S.C. 154(b) by 92 days.

(21) Appl. No.: 14/206,490

(22) Filed: Mar. 12, 2014

(65) Prior Publication Data

US 2014/0266717 A1 Sep. 18, 2014

Related U.S. Application Data

(60) Provisional application No. 61/791,077, filed on Mar. 15, 2013.

(51) Int. Cl.
| | |
|---|---|
| *G08B 21/00* | (2006.01) |
| *G06Q 10/00* | (2012.01) |
| *G06Q 30/00* | (2012.01) |
| *G09F 25/00* | (2006.01) |
| *G08B 1/08* | (2006.01) |

(Continued)

(52) U.S. Cl.
CPC ........... *G06Q 10/20* (2013.01); *G06Q 30/016* (2013.01); *G08B 25/14* (2013.01); *G08B 29/185* (2013.01)

(58) Field of Classification Search
CPC ...... G06Q 10/20; G06Q 30/016; G08B 25/14; G08B 29/185
USPC .............. 340/540, 286.01, 517, 506, 539.13; 379/10.02
See application file for complete search history.

(56) References Cited

U.S. PATENT DOCUMENTS

| | | |
|---|---|---|
| 7,183,899 B2 | 2/2007 | Behnke |
| 8,350,694 B1 | 1/2013 | Trundle et al. |

(Continued)

FOREIGN PATENT DOCUMENTS

| | | |
|---|---|---|
| JP | 2001222779 | 8/2001 |
| JP | 2007128283 | 5/2007 |

(Continued)

OTHER PUBLICATIONS

English abstract and English machine translation of the specification and claims for JP4150570. Sep. 17, 2008.

(Continued)

*Primary Examiner* — Jack K Wang
(74) *Attorney, Agent, or Firm* — Holland & Hart LLP

(57) ABSTRACT

An automation system may include a control panel monitoring one more automation system components. When an event is detected at an automation system component, the control panel may automatically access a local or remote data source and identify procedures to be implemented in response to the event. The procedures may include follow-up actions and procedures specific to a particular dealer of the automation system. Dealer-specific procedures may then be displayed or otherwise communicated by the control panel to alert the user of what actions to take or to expect.

19 Claims, 12 Drawing Sheets

(51) Int. Cl.
*G08B 23/00* (2006.01)
*G08B 29/00* (2006.01)
*H04M 1/24* (2006.01)
*G08B 25/14* (2006.01)
*G08B 29/18* (2006.01)

(56) References Cited

U.S. PATENT DOCUMENTS

| | | | |
|---|---|---|---|
| 8,525,665 B1 | 9/2013 | Trundle et al. | |
| 2004/0186739 A1 | 9/2004 | Bolles et al. | |
| 2005/0200474 A1* | 9/2005 | Behnke | G08B 25/14 340/521 |
| 2005/0201545 A1* | 9/2005 | Rockett | H04L 67/125 379/265.01 |
| 2005/0216302 A1* | 9/2005 | Raji | G06Q 30/02 705/314 |
| 2006/0149414 A1* | 7/2006 | Archacki, Jr. | F24F 11/0086 700/227 |
| 2007/0262857 A1 | 11/2007 | Jackson | |
| 2008/0027606 A1* | 1/2008 | Helm | G06Q 10/00 701/29.5 |
| 2011/0112717 A1* | 5/2011 | Resner | G07C 5/008 701/31.4 |
| 2012/0005146 A1* | 1/2012 | Schwartz | G06N 5/025 706/47 |
| 2012/0154145 A1 | 6/2012 | Anson et al. | |
| 2012/0158161 A1* | 6/2012 | Cohn | H04L 12/2827 700/90 |
| 2012/0158203 A1* | 6/2012 | Feldstein | G06F 1/3231 700/295 |
| 2012/0275588 A1 | 11/2012 | Gregory | |
| 2013/0035774 A1 | 2/2013 | Warren et al. | |
| 2014/0310788 A1* | 10/2014 | Ricci | B60Q 1/00 726/6 |
| 2015/0025704 A1* | 1/2015 | Horihata | H04L 12/12 700/297 |

FOREIGN PATENT DOCUMENTS

| | | |
|---|---|---|
| JP | 4150570 | 9/2008 |
| KR | 200311947 | 5/2003 |

OTHER PUBLICATIONS

English abstract and English machine translation of the specification and claims for JP2007128283. Aug. 17, 2001.
English abstract and English machine translation of the specification and claims for JP2001222779. Aug. 17, 2001.
English machine translation of the specification, claims and abstract for KR200311947. May. 1, 2003.
International Search Report for PCT/US2014/026098. dated Jul. 18, 2014.
Honeywell, "Pro-Watch 3.81, Security Management Suite", Automation and Control Solutions, Honeywell Integrated Security, pp. 1-8, 2012.
Supplementary European Search Report for EP Application No. 14768017.7, mailed Jul. 1, 2016.

* cited by examiner

METHODS FOR PROVIDING NOTIFICATIONS FOR FOLLOW-UP ACTIONS IN RESPONSE TO EVENTS DETECTED BY AN AUTOMATION SYSTEM, AND SYSTEMS AND DEVICES RELATED THERETO

CROSS-REFERENCE TO RELATED APPLICATIONS

This application claims the benefit of U.S. Provisional Patent Application No. 61/791,077 entitled "Methods For Providing Notifications For Follow-Up Actions In Response To Events Detected By An Automation System, And Systems And Devices Related Thereto," filed on Mar. 15, 2013, which is assigned to the assignee hereof.

TECHNICAL FIELD

The present disclosure relates to automation systems. More particularly, embodiments of the present disclosure relate to the use of an automation system with a building and responding to events associated with the automation system. More particularly still, embodiments of the present disclosure relate to providing users of automation systems with customized information and options based on the specific procedures of a dealer or provider of the automation system.

BACKGROUND

People are increasingly interested in providing security and security services to various locations, buildings, etc. Security in a home setting, for example, may be particularly significant for a home owner or resident who is away from home, who has small children, or who keeps valuable items at the home. For such an owner or resident to feel secure, security and privacy may be provided through various security mechanisms. Example mechanisms and methods include using door and window locks, the use of video security cameras, or intrusion detection security systems. Some or all of these components may be automated, and potentially included as part of an automation system associated with one or more other functions.

In an automation system, various types of alerts or events may be triggered. For instance, in the context of a security system, an alert may be triggered if a window or door lock detects a breach. Opening of a door or window once armed may indicate that an intruder potentially gained access to the building. Other similarly significant, or more benign, alerts may also be triggered. By way of illustration, a wireless sensor may lose power or otherwise stop communicating with the security system. In such a case, an alert may be created to indicate that communication has stopped. Other alerts and events may of course be detected, and may be associated with a wide variety of systems, including security systems, sprinkler systems, entertainment systems, lighting systems, and the like.

Generally, when an event or alert is identified, the user may be notified. As an example, a home automation control panel may display text or other indicia to indicate what event has occurred. In the above examples, for instance, the control panel may indicate that an entry has been breached or that the control panel has lost communication with a control panel. The user may then take appropriate actions to try and remedy the event. For instance, the user may call a dealer or provider of the automation system to schedule a maintenance service to determine why the sensor has lost communication, or the user may call the police if it is suspected an intruder has entered, or attempted to enter, the building.

SUMMARY

In accordance with aspects of the present disclosure, embodiments of methods, systems, software, control panels, computer-readable media, and the like are described that relate to security systems and other types of automation systems. In accordance with some embodiments of the present disclosure, a control panel is connected to one or more automation components of an automation system, and monitors events within the automaton system. Upon detection of an event, the control panel may automatically access information about specific procedures set-up by a dealer of the automation system. The specific procedures may be displayed or otherwise communicated by the control panel to allow a user to be aware of what actions the user should take and/or what actions the dealer or another party will take. In some embodiments, the procedures relate to out-of-band follow-up procedures.

In a more particular example embodiment, an automation system may detect and event. The control panel may access a local or remote data store to identify the event, a procedure specific to the event, and the dealer associated with the automation system. Some procedures may occur in-band and potentially happen automatically, such as sounding an alarm, contacting emergency personnel, or the like. Other procedures may be out-of-band or delayed. As an example, a phone call to check on a customer, or scheduling of a service call may be scheduled to occur at a later time. Any of these procedures may not only be implemented, but also communicated to the control panel and displayed or otherwise output to let a user know what actions—whether occurring now or later—are part of the dealer's service and system.

According to another embodiment of the present disclosure, event and dealer-specific actions may be facilitated by a control panel. Specific procedures for an event and dealer may include information about control panel options or functions to be enabled. Example functions may include communication functions enabled in response to an event, scheduling functions in response to an event, and instructional functions in response to an event. Different dealers may set-up different functions and procedures such that the same event at different control panels may result in the display and/or use of different procedures or functions.

Other embodiments of the present disclosure relate to registering event and dealer-specific events in a procedure description system. Access may be granted to the procedure description system, and a particular dealer may be identified. Specific procedures associated with the dealer may then be registered. To register a procedure, an event may be specified, along with an automatic, delayed, in-band, out-of-band, or other procedure. Control panel or other automated functions associated with an event may also be specified. A storage device may then store information about such procedures and/or functions, and associate them with particular events and/or automation system dealers. The storage device may include information for only a single dealer, or may include information for multiple dealers.

Other aspects, as well as the features and advantages of various aspects, of the present disclosure will become appar-

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION

Systems, devices and methods of the present disclosure are configured for use in connection with residential and/or commercial buildings, or with other locations which may use an automation system. Without limiting the scope of the present disclosure, a home or business may have a security system installed to monitor use of the building, including entry into the building through a door, window, or other similar entry point. Sensors at the entry point may detect when the entry point is open or closed, and can respond in different ways in response to a change in status. For instance, when the security system is armed, an alarm may sound when the door is opened. Optionally, the police or security may be contacted to have them monitor the building. Of course, other types of components within the automation system may result in other responses. For instance, if a leak in a sprinkler system is detected, a response may include shutting off a valve. If no one is detected in a particular location, lighting may be turned off or dimmed.

Figure 1:
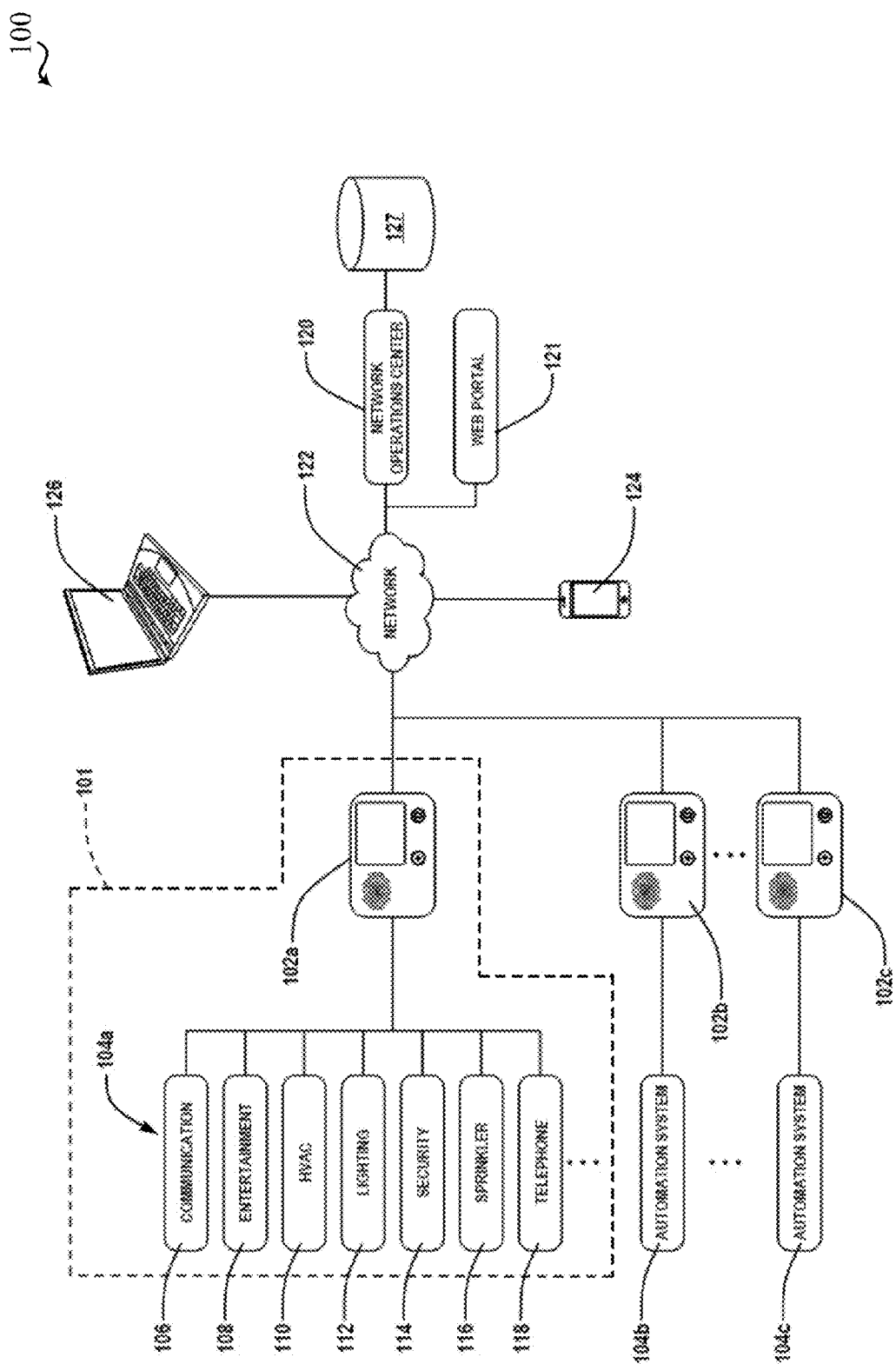
FIG. 1 is a schematic illustration of an example automation system according to one embodiment of the present disclosure.

Turning now to FIG. 1, an example distributed system 100 is illustrated for allowing control and/or monitoring of certain aspects of a physical location (e.g., a building such as a home, residence, office, etc., an outdoor space, and so on). The illustrated distributed system 100 may generally represent, or include, an automation system associated with the particular location. As part of such a distributed system 100, a control panel 102a may be used. The control panel 102a may, but need not necessarily, be located at the location being monitored or controlled. Certain aspects of the distributed system 100, or the automation system, may be administered through the control panel 102a, or a user may be provided with information about a status of the automation system.

More particularly, the illustrated distributed system 100 may include the control panel 102a, which can interact with an automation system 104a for the location. The automation system 104a may generally be referred to herein as a "security system," but need not be limited to security-related features. Indeed, the automation system 104a of the illustrated embodiment may include a number of different components, any or all of which may be used in connection with the control panel 102a. In this particular embodiment, for instance, the automation system 104a includes a communications system 106, an entertainment system 108, a heating, ventilation, and air conditioning ("HVAC") system 110, a lighting system 112, a security system 114, a sprinkler system 116, and a telephone system 118.

Any or all of the systems 106-118 may include sensors, controllers, valves, switches, or other components, or any combination thereof, that can be controlled by the control panel 102a, or which can have a status monitored by the control panel 102a. Such components, which are generally used to monitor or control some aspect of a physical location associated with the control panel 102a, may generally be referred to herein as "automation components," and can perform a variety of functions. For instance, a set of one or more automation components may be integrated as part of the security system 114 associated with the location. In some embodiments, the automation components of the security system 114 may include sensors that detect intruders (e.g., unauthorized opening of a door or window, motion sensors, etc.), sensors that detect smoke or fire, or some other security-related component or a combination thereof. In some embodiments, the security system 114 may include automation components such as cameras which obtain still or video images of a location.

Automation components of the automation system 104a may take any number of forms, and are not limited to security components. For instance, automation components may include entertainment components such as televisions, recordable media players (e.g., DVD player, Blu-Ray Player, digital video recorders, VCR, set-top box, etc.), projectors, speakers, stereos, and the like, any or all of which may be separate from the control panel. Such entertainment components may be used, by way of example only, to turn on a television, radio, optical disk player, or the like, change a channel or volume of television or radio, or for other purposes. In the same or other embodiments, automation components may include thermostats, air conditioners, furnaces, temperature sensors, and the like, or controllers therefor. Monitored and/or controllable automation components may further include lighting system components such as light fixtures, switches, motion sensors, etc. to monitor the status of lights and/or to turn lights on or off. Additional components or controllers may include security system components including sensors or detectors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.), video or still cameras, speakers, microphones, or other components. In embodiments where the automation system 104a includes a sprinkler system 116, the automation components may include valves, actuators, sensors (e.g., flow rate sensors, proximity sensors, etc.), sprinklers, pumps, and the like. In a similar manner, where one or more of the automation components is part of a telephone system 118, the automation components may include telephones, answering machines, call forwarding components, intercoms, and the like. Some or all of the automation components of the various systems 106-118 may also include wireless communication system components. As an example, the automation components may include routers, switches, access points, repeaters, bridges, and the like.

When a given condition occurs at a monitored automation component, the control panel 102a may be used to cause other automation components to respond. Additionally, or alternatively, the control panel 102a may communicate with components, including those remote from the physical location. As an example, upon monitoring the automation components of the systems 106-118, the control panel 102a can detect changes in status, which changes may correspond to events. For instance, as discussed herein, if the security system 114 includes an automation component, such as a sensor, at a door, the control panel 102a can detect when the door is opened. If the security system 114 is armed, opening of the door may correspond to an event indicating a potential intruder has entered the building. The control panel 102a may be programmed to respond accordingly. For instance, the security system 114 may also include an alarm automation component. The control panel 102a may turn on the alarm of the alarm automation component. Of course, the control panel 102a may also perform other actions, including initiating a phone call to the police or security (e.g., using the telephone system 118). As will be apparent in view of the disclosure herein, in the event of another type of event—whether detected using the security system 114 or another of the systems 106-118—the control panel 102a can facilitate taking of other actions.

In at least some embodiments, the control panel 102a may communicate with one or more third parties. For instance, FIG. 1 illustrates the control panel 102a as being in communication with a network operations center ("NOC") 120. Optionally, the control panel 102a may provide the NOC 120 with information about detected events. In some cases, the NOC 120 may then take one or more actions. By way of illustration, if the control panel 102a notifies the NOC 120 that a potential intruder has entered a building, the NOC 120 may respond by notifying police or security. Consequently, some actions taken in response to a detected event may be taken by the NOC 120 rather than by the control panel 102a.

To allow the NOC 120 to be aware of detected events, and to potentially respond to such events, the control panel 102a may communicate with the NOC 120 through a communications network 122. The communications network 122, which may carry electronic communications, may include the Internet, local area networks, wide area networks, virtual private networks ("VPN"), telephone networks, other communication networks or channels, or any combination of the forgoing. Thus, it should be understood that the communications network 122 may operate in any number of different manners, and can include different components, and may be distributed so as to include different components at different locations. For instance, the communications network 122 may include a wireless communication system such as that provided by a mobile phone provider. As an example, the control panel 102a may include a radio component to communicate with or using the communications network 122 through GSM, CDMA, LTE, HSPA+ or other similar technologies used by mobile phone systems. In other embodiments, other wireless systems or even wired communication may be used. Any combination of the foregoing may also be used. Thus, while a single communications network 122 is illustrated, such a component may be illustrative of multiple devices or components. For instance, the communications network 122 may include multiple networks interconnected to facilitate communication.

Regardless of the particular type of protocols and systems used by the communications network 122, the NOC 120 may receive information from the control panel 102a about events detected using automation components. In some embodiments, the NOC 120 includes human operators who monitor the events. Based on the type of event detected, the human operator may initiate some type of response. That response may be implemented using the control panel 102a by, for instance, sending information back to the control panel 102a, initiating voice communication through the control panel 102a, or in other manners. When implementing actions using the control panel 102a, the actions may be considered to be "in-band". In other embodiments, the human operator may initiate an "out-of-band" response. Such a response may include actions taken without use of the control panel 102a. For instance, after detecting an intruder, a phone call may be made to police or security to request that they monitor the location where the intruder was detected. A phone call could also be placed to the user or owner of the automation system 104a. As an example, the NOC 120 may be used to place a call to a telephone 124, send an email retrieved at the computing device 126, or otherwise initiate some communication or action.

While some responses may be taken or initiated by using a human operator, other responses may be automated. For instance, if a signal representative of a potential intruder alert is detected, the NOC 120 may automatically initiate an action, such as calling or otherwise communicating with the police, a home owner, or the like (e.g., text message, e-mail, emergency alert systems, etc.). The NOC 120 may include computing devices to initiate such actions. In accordance with at least one embodiment, the NOC 120 includes, or communicates with, a data store 127. The data store 127 may include information to allow automated components of the NOC 120 to determine what actions to take. Each event may, for instance, be associated with a different in-band and/or out-of-band action that can be taken, with such different actions being stored in the data store 127. As discussed in greater detail herein, the data store 127 may also store a description of dealer-specific procedures, including follow-up procedures, as part of a procedure description system.

The NOC 120 may optionally be used for other or additional purposes beyond responding to events detected by the automation system 104a. For instance, the NOC 120 may be a central monitoring location for use with multiple control panels 102a-102c. Indeed, the NOC 120 may be used to monitor any number of control panels 102a-102c, each of which may be connected to its own automation system 104a-104c. Further, the NOC 120 may update software or firmware on the control panels 102a-102c to ensure that the control panels 102a-102c are operating and communicating properly with automation components of their respective automation systems 104a-104c and/or with the NOC 120. As a result of such monitoring, when the automation components of an automation system 104a-104c detect a certain event (e.g., a security-related event such as a break-in, a fire, etc.), the control panel 102a-102c can obtain the information and optionally takes some prescribed action (e.g., initiating an alarm, performing a corrective action, notifying an administrator or user, etc.). The corresponding control panel 102a-102c may also communicate such information to the NOC 120 through the communication network 122 for review or action.

The distributed system 100 of the present disclosure may be implemented as a communication system in which the operations of various systems and components can be monitored through communication links. As discussed herein, such communication links may include wired or wireless links, or can include a combination of wired and wireless links, any or all of which may use different protocols or networks. Regardless of the particular mode of communication, the status or operation of devices and components can be reported to, or controlled using, the corresponding control panel 102a, network operations center 120, or even other electronic devices 124, 126. The control panel 102a, and the components of the automation system 104a, may therefore include a number of different types of components that provide or receive electronic signals of one or more different types.

By way of example, the control panel 102a may be equipped to use one or more different communication protocols in communicating with automation components of the automation system 104a and with the communication network 122. Such communication protocols may be implemented using any combination of one or more of wired or wireless communication. As an example, automation components of the automation system 104a may operate using a wireless protocol, or system that allows a mesh network to be formed. Each automation component may, for instance, optionally be able to communicate with some or any other automation component, provided they are in range of each other. If the automation components use a wireless system for communicating with the control panel 102a, an automation component that is in range of the control panel 102a may also send information to, or receive information from, the control panel 102a. In some embodiments, the automation components may communicate with each other and the control panel 102a using the same communication protocol. Although not intended to limit the scope of the present disclosure, an example communication protocol for such an embodiment may be a low power, short range wireless communication protocol (e.g., Z-Wave, ZigBee, etc.). In other embodiments, larger range wireless communication protocols (e.g., WiFi, LightwaveRF, etc.) may be used in addition to, or instead of, the shorter range alternatives. Such connections may also allow two-way communication or may provide only one-way communication.

The control panel 102a may also optionally communicate with the communication network 122 and/or the NOC 120 or electronic devices 124, 126 using the same or other protocols. As an example, if the electronic device 124 is sufficiently close to the control panel 102a, a physical connection may be used, or a suitable wireless communication protocol (e.g., Z-Wave, ZigBee, Bluetooth, WiFi, etc.) may be used.

Communication with the communication network 122 may also be made in any suitable manner, including using wireless or wired communication, or a combination thereof. For instance, as discussed herein, an example control panel 102a may communicate with a network 122 operating on a mobile telephone system. A GSM, CDMA, LTE, HSPA+, or other similar wireless communication component may therefore be included in the control panel 102a and the network 122 to allow for such communication. In other embodiments, the network 122 may have other forms to allow for alternative or additional types of communication between the network 122 and the control panel 102a. Moreover, a NOC 120 may communicate with different control panels 102a-102c of different automation systems 104a-104c using the same or different communication protocols, and potentially allow such control panels 102a-102c to communicate with each other.

Figure 2:
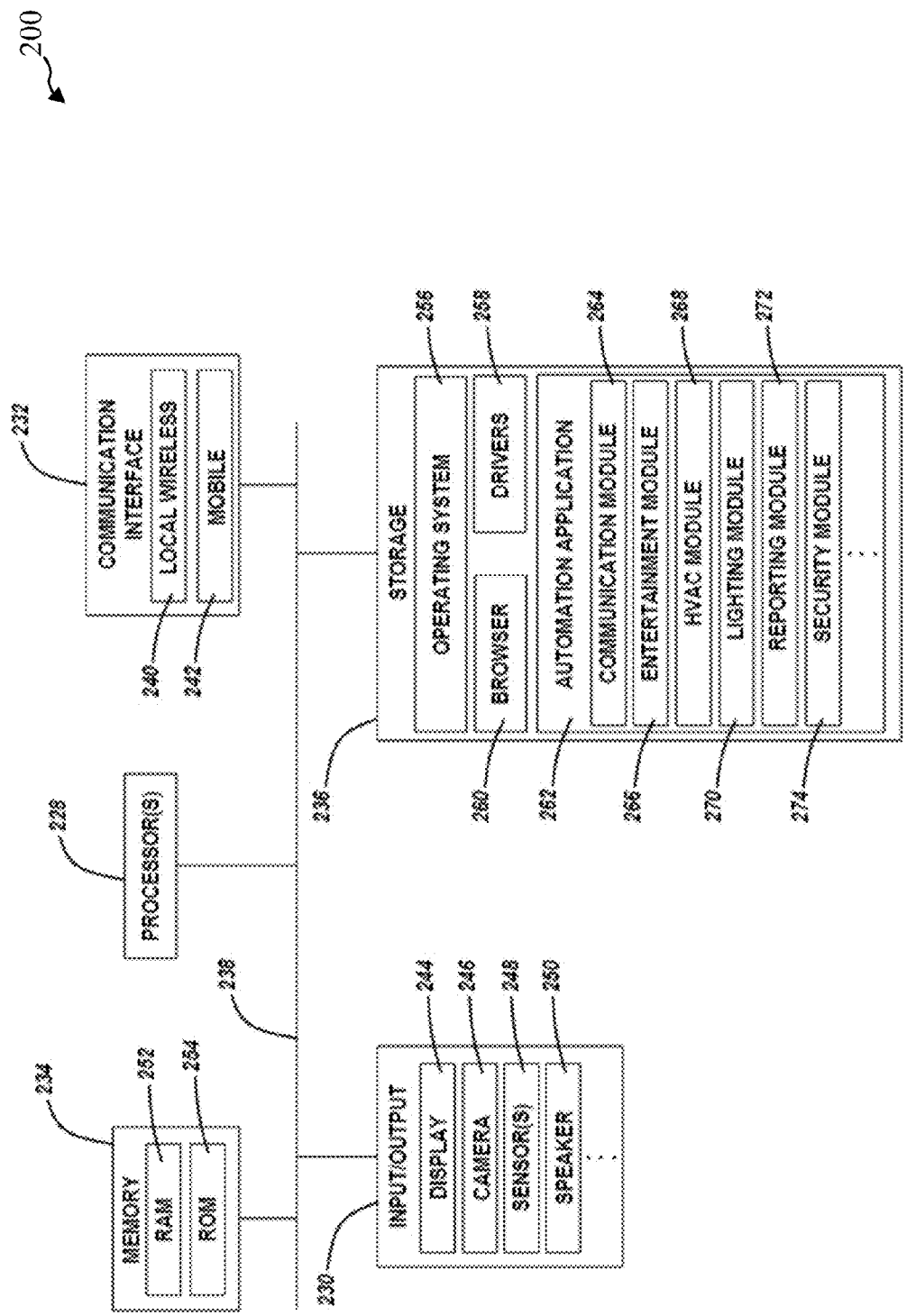
FIG. 2 is a schematic illustration of an example control panel usable in an automation system, according to one embodiment of the present disclosure.

Turning now to FIG. 2, an example control panel 200 is schematically illustrated. It should be appreciated in view of the disclosure herein that the control panel 200 may be used in the distributed system of FIG. 1 or in connection with any other system. Further, the illustrated control panel 200 is merely illustrative, and a control panel of the present disclosure may have fewer or additional components, or elements other than those expressly described or illustrated, or may be used in connection with systems or components other than those of FIG. 1 or the methods, systems, and devices disclosed herein.

In FIG. 2, the control panel 200 includes multiple components interacting together over one or more communication channels. In this embodiment, for instance, one or more processors 228 may communicate with input/output devices 230, a communication interface 232, memory 234 and/or a mass storage device 236 via a communication bus 238. The processors 228 may generally include one or more processing components, including a central processing unit, a graphics processing unit, or the like, any of which may be capable of executing computer-executable instructions received or stored by the control panel 200.

The processors 228 may communicate with the communication interface 232 using the communication bus 238. The communication interface 232 may receive or send communications via one or more networks (e.g., network 122 of FIG. 1) or otherwise communicate with other components or devices (e.g., automation system 104a of FIG. 1). Received communications may be provided over the communication bus 238 and processed by the processors 228.

In the particular embodiment illustrated in FIG. 2, the communication interface 232 may include multiple components to allow communication via one or more different protocols. For instance, the illustrated embodiment includes an interface component 240 for connecting to local components, such as over a wireless mesh network. As discussed herein, an example of the component 240 may include radio which operates using Z-Wave, ZigBee, or other protocols, or some combination thereof. Such a component may specifically be used to communicate with security or other automation or automation system components for a residence or other structure, including one or more sensors, cameras, controllers, and the like.

In still another example embodiment, an example communication interface 232 may include an interface component 242 for communicating over a mobile telephone network. An example network may include, for instance, GSM, CDMA, LTE, HSPA+, or other communication typically used by a wireless carrier to communicate with a mobile device such as a telephone or tablet computing device. As discussed herein, in one example embodiment, the interface component 242 may be provided to facilitate communication between the control panel 200 and a network operations center (e.g., NOC 120 of FIG. 1).

In still another embodiment, the communication interface 232 may include other components. For instance, an example control panel 200 may be used to send and/or receive communications over a wireless protocol such as WiFi (i.e., IEEE 802.11), Bluetooth, or some other protocol. Moreover, according to some embodiments as disclosed herein, the wireless component 240 may be configured to allow the control panel 200 to function as a wireless access point.

According to some embodiments, the control panel 200 may further include one or more input/output devices 230. In FIG. 2, the input/output devices 230 may communicate with one or more processors 228 using the communication bus 238. Any suitable type of input/output device may be provided. For instance, a control panel 200 may include buttons, keypads, or the like through which input is received from a user. A display 244 may also be provided and used as an output to display information to a user. In some embodiments, the display 244 may also act as an input. For instance, the display 244 may be a touch-sensitive display allowing a user to touch the display 244 to make a selection, to provide input through a gesture, or to otherwise provide input. Still other types of input or output devices may include a camera 246, one or more sensors 248 (e.g., a microphone, infrared sensor, etc.), audio output devices such as a speaker 250, ports, or other elements or some combination thereof. The illustrated input/output devices 230 of a control panel 200 are merely illustrative. In other embodiments, for instance, trackball, mouse, biometric reader (e.g., iris scanner, fingerprint reader, etc.), GPS device, or other component, or some combination of the foregoing, may be included.

The control panel 200 may also include memory 234 and mass storage 236. In general, the memory 234 may include one or more of persistent and non-persistent storage, and in the illustrated embodiment the memory 234 is shown as including random access memory 252 and read only memory 254. Other types of memory or storage may also be included.

The mass storage 236 may generally be comprised of persistent storage in a number of different forms. Such forms may include a hard drive, flash-based storage, optical storage devices, magnetic storage devices, or other forms which are either permanently or removably coupled to the control panel 200. In some embodiments, an operating system 256 defining the general operating functions of the control panel 200, and which is executed by the processors 228 may be stored in the mass storage 236. Other components stored in the mass storage 236 may include drivers 258 (e.g., to facilitate communication between the processors 228 and the input/output devices 230 and/or components of the communication interface 232), a browser 260 (e.g., to access or display information obtained over a network, including mark-up pages and information), and application programs.

Application programs may generally include any program or application that may be used in the operation of the control panel 200. Examples of application programs may include applications specifically designed for use with a security and/or automation system (e.g., automation application 262), or more general use applications. Examples of more general use applications can include word processing applications, spreadsheet applications, games, calendaring applications, weather forecast applications, sports scores applications, and other applications.

As shown in FIG. 2, in at least one embodiment, the automation application 262 may include modules or components capable of being used by the control panel 200 in connection with a security or automation system. For instance, the automation application 262 may include a communication module 264. Such a communication module 264 may generally be used to control how one or more communication systems of a residence or commercial building operate. As an example, an intercom system may be provided at an entry to the building, and the communication module 264 may monitor its use and potentially be used in passing communications (e.g., using a speaker or sending communications to a remote device). The communication module 264 may similarly be configured to facilitate visual communications (e.g., using one or more cameras and/or visual display devices). Moreover, the communication module 264 may be used to determine when to communicate at all.

The illustrative automation application 262 is also shown as including an optional entertainment module 266, HVAC module 268, and lighting module 270. The entertainment module 266 may generally be used to monitor and/or control entertainment-related devices and functions of a location. For instance, the channel or volume of a television may be monitored and potentially changed using the control panel 200. The HVAC module 268 may generally be used to monitor or control heating or air conditioning components. For instance, if the temperature in a location is too high or low, a thermostat may be controlled by the HVAC module 268 to obtain a more comfortable temperature. Similarly, the lighting module 270 may monitor, control or otherwise interface with lighting components including switches, lighting fixtures, and the like. In some embodiments, such as where a light is provided at an entry way, the lighting module 270 may interface with sensors used to detect the presence of a person (e.g., a motion sensing light). The lighting module 268 may also be used to perform other functions (e.g., automatically turn on a light in response to a trigger event).

The modules 272, 274 may provide additional, and potentially similar functions. For instance, the security module 274 may be used to interface with security-based automation components, such as sensors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.). When an event is detected, the security module 274 may determine how the control panel 200 should respond to the event.

The reporting module 272 may have another function. For instance, in response to some events, it may be desirable to provide information to a remote or other third party. As an example, a NOC may be sent information about an event to allow the NOC to respond to the event. In some embodiments, the reporting module 272 may therefore collect information from one or more other modules 264-274 and prepare a report on events, the status of automation components, or the like. Such a report may be prepared periodically or in response to a particular event. In one embodiment, an event may trigger a report by the reporting module 272, which can then use the communication interface 232 to send the report to a NOC or other location.

The reporting module 272 may also be used for other functions. As discussed herein, a control panel 200 may also receive information from one or more sources. Such sources may include automation system components, and the reporting module 272 may collect, store, and potentially report on received information. The reporting module 272 may also receive information from a NOC or other similar location or service provider. As an example, a NOC may send information requesting that the control panel 200 take a particular action (e.g., turn on an alarm). The reporting module 272 may receive the information and then distribute the information to an appropriate module (e.g., security module 274) or automation component. In still another embodiment, information that is received may be displayed or otherwise output using the input/output devices 230.

In accordance with at least some embodiments of the present disclosure, the reporting module 272 may be used to monitor events and report information specific to a dealer or provider associated with the control panel 200. For instance, a particular service provider (i.e., a dealer), may provide the control panel 200 to a customer. The dealer may have specific protocols for how it wishes to handle certain events detected by the control panel 200 and the associated automation system. The reporting module 200 may be used to provide information on those specific protocols to the customer. As an example, if communication is lost with a particular sensor, the reporting module may determine that the dealer's preferred course of action is to notify the NOC of the lost communication, and then allow the dealer to contact the customer to set-up a service call and check on the sensor. In response, the reporting module may therefore direct the communication interface 232 to contact the NOC and provide information about the lost communication. The reporting module 272 may further communicate with the display 244 to update the customer on the status. The reported information displayed on the display 244 may indicate not only that communication was lost, but also that the NOC or dealer was notified. Still additional information may include a notice that the dealer will contact the customer to set-up a service call.

The reporting module 272 may report any number of other types of information, and the above example is merely illustrative. In other embodiments, for instance, the information may indicate that the customer should take some course of action, that the dealer will take some action, or that a third party will take some action. Further information available through the reporting module 272 may therefore relate to follow-up actions to be taken in response to an event, which actions may even be out-of-band relative to the control panel 200. Moreover, the reporting module 272 may obtain such information from a local store of information (e.g., in storage 236 or memory 234) or from an external source (e.g., a NOC, a remote data store, etc.).

The modules shown in FIG. 2 as part of the automation application 262 are purely provided to illustrate the variety of different types of modules that may be included, and are not intended to be an exclusive list. In other embodiments, for instance, additional modules may include a sprinkler system module (e.g., to verify water flow rates at one or more locations, turn sprinklers on or off, etc.), a telephone module (e.g., to interface with a telephone system and potentially run telephone calls through the control panel, to forward calls, etc.), and the like. Another example module could include a remote access module. Such a module could, for instance, enable the control panel 200 to be accessed using remote devices (e.g., devices 124, 126 of FIG. 1), and to potentially have communications relayed through the control panel 200 either from or to the remote devices 124, 126. Thus, a user of a remote device could potentially set or view communications, door cameras, entertainment, lighting, security, HVAC, sprinkler, telephone, or other settings remotely, or even receive or otherwise monitor audio or video feeds from a remote location. Of course, the automation application 262 may also include additional or other modules or components, including authentication, settings, preferences, emergency override, updating, and other modules.

Figure 3:
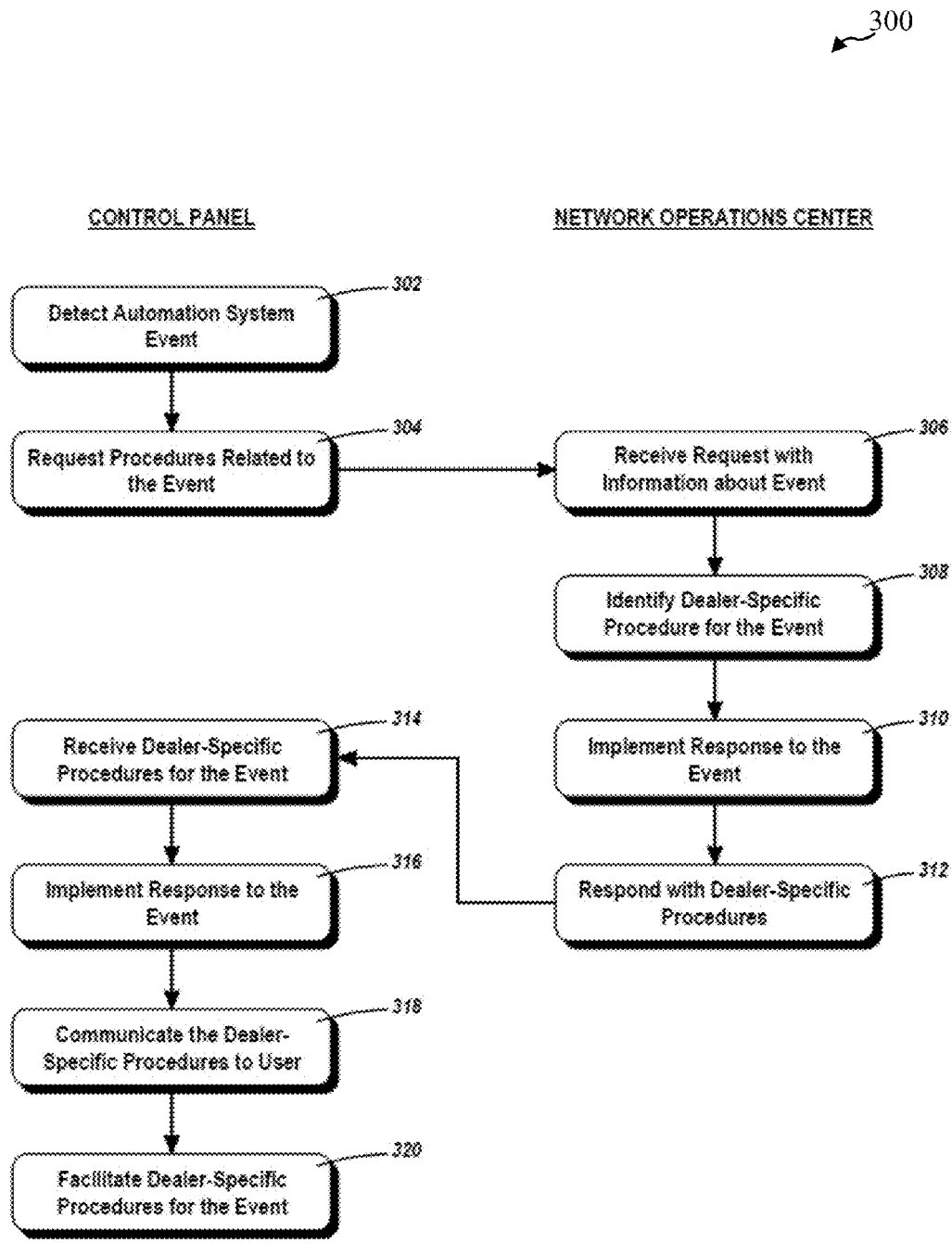
FIG. 3 illustrates an example method for providing an automation system user with custom procedures in response to an event of the automation system, according to another embodiment of the present disclosure.

Turning now to FIG. 3, an example method 300 for responding to events is illustrated. The particular method 300 illustrated in FIG. 3 may allow a response to a detected event to include dealer-specific procedures related to the event. Such procedures may be reported or otherwise communicated to a user of an automation system. One or more acts or steps of method 300 may be performed by or operate in conjunction with control panel 200 described above in reference to FIG. 2. Consequently, the same control panel or other device may be used in connection with any of multiple dealers to not only take actions in response to events as directed by a dealer, but also to notify the customer of the in-band or out-of-band follow-up procedures recommended by a particular dealer.

More particularly, the method 300 of FIG. 3 includes detecting an automation system event 302. As discussed herein, any number of different types of events may be detected. For instance, in an automation system that includes a security system, an alarm, false alarm, or other event may be detected. An automation component may also be determined to have low power (e.g., a low battery), or may drop out of communication with a control panel. Of course, other events may also be detected (e.g., a water leak in a sprinkler system, a light on when no one is present, etc.).

Regardless of the particular type of event, a request may be prepared to obtain procedures related to the event (act 304). The request need not have any particular form, and indeed may take the form of a notification. For instance, the request prepared in act 304 may include a notification of the detected event, and the recipient of the notification may treat the notification as a request for information, including dealer-specific procedures as discussed herein.

Various types of procedures may be obtained. For instance, procedures may include steps to be taken by an automation system to respond to an event. As an example, an alarm may sound or be turned off, a system may be armed or disarmed, a valve may be turned on or off, or the like. Procedures may also include actions to be taken by a third party. A central monitoring station (e.g., a NOC, such as NOC 120 of FIG. 1) may take some action in response to an event (e.g., initiating communication with the police or security, contacting an owner, etc.). In other embodiments, procedures may relate to follow-up procedures to be taken in response to a certain type of event.

In the embodiment shown in FIG. 3, the method may be performed at least partially by a control panel. The control panel (e.g., control panel 200) of a home automation system may request procedures related to the event in act 304 by, for instance, querying a local database. In other embodiments, such as that shown in FIG. 3, the control panel may make the request by sending it to an external source such as a NOC. The NOC may receive the request in act 306. Optionally, the request may include information about the event detected in act 302. For instance, the control panel may send a request or notification in act 304 that identifies the type of event detected, or the conditions present that may lead the NOC to determine an event has taken place. Using the information about the event, the NOC may identify procedures for the event, which procedures can be dealer-specific (act 308). As discussed herein, such procedures can include various different types of procedures, including procedures to be implemented by the NOC, by the control panel, by an automation system, by a third party, etc. If the NOC is to take or initiate action, the NOC may implement a response to the event in act 310. Additionally, information to be communicated to the customer, which information can be dealer-specific, may be sent in act 312 and received by the control panel in act 314.

Upon receipt of the dealer-specific procedures for the event in act 314, the control panel may optionally implement some response to the event in act 316. Such a response may include, for instance, sounding an alarm, turning on/off a light, resetting a system, or taking other action. In some embodiments, the control panel may also communicate dealer-specific procedures to the user (act 318). Communicating the dealer-specific procedures in act 318 may also occur as part of act 316. Communication of the dealer-specific procedures may occur in a number of different manners. For instance, the control panel may display text to indicate what action was taken by the NOC, control panel, or other device or system in response to the event. Such responses may be in-band or out-of-band. In still other embodiments, the communication of dealer-specific procedures in act 318 may indicate what actions will or may be taken in the future, or even that no action will be taken. In another embodiment, communication of dealer-specific procedures in act 318 may include providing information to display to the user, the information requesting action by the user. The actions to be taken by the user may also be in-band or out-of-band. An in-band response may, for instance, ask a user to press a button, click a link, or the like. Implementing the response in act 316 may be fully automated. In at least one embodiment, where information is displayed, act 316 may be automated to display information, and then may also include other automated actions in response to a user providing in-band input at the control panel.

As an illustration, the method 300 may be used to detect an event such as an alarm; however, it may be determined that the alarm was of sufficiently short duration to be considered a false alarm. The control panel may prepare a request or notification of the event in act 304 and send it to the NOC. Upon receipt of the request/notification in act 306, the NOC may identify specific procedures the dealer has for responding to the event (act 308). For instance, because it is likely a false alarm, the dealer-specific procedures may indicate that no call to the police or security is to be made, but should be treated as if no alarm had sounded. Implementing a response in acts 310 and 316 may therefore include taking no action. Additionally, however, the dealer may determine it is beneficial to follow-up with a home or business owner in the event of a false alarm. The identified procedures 308 may, therefore, also indicate that the dealer's procedure is to call the owner within twenty minutes to follow-up and make sure the alarm was indeed a false alarm.

The follow-up procedures may then be sent in act 312 to the control panel. Upon receipt of the follow-up procedure in act 314, the control panel may display information indicating the follow-up procedure of the dealer. Thus, the control panel may display a notice to the effect of "A false alarm was detected. We will call you shortly to check-in on you." Of course, in addition to, or instead of, communicating the procedures using a display of the control panel, the communication may occur in other manners. For instance, the control panel may include a speaker for audibly presenting the follow-up procedures of the dealer. In other embodiments, an email, text message, or phone call may be made to a phone or other electronic device. Such a call or message may be made by the control panel, or even by the NOC. Indeed, while FIG. 3 illustrates various acts as occurring at either a control panel or a NOC, any or all acts may be shifted to different locations or systems. Thus, the method 300 may be fully performed in the control panel, or fully performed by the NOC. In other embodiments, different acts 302-320 may be shifted between the NOC and control panel, or even to third parties.

In response to an event, the method 300 may also include an act of facilitating implementation of dealer-specific procedures for an event (act 320). Such an act 320 may take any number of forms. By way of example, a dealer-specific response to an event detected by an automation system may call for follow-up in the form of a service call. Facilitating such a dealer-specific procedure in act 320 may therefore also include facilitating scheduling of the service call. Where implemented by a control panel, the control panel may display available dates/times for a service call and, upon selection by the user, communicate the information to the NOC for scheduling. The control panel could additionally, or alternatively, include a call device to place outgoing calls, so that the user can make a call directly through the control panel to schedule the service call. Optionally, such scheduling is automated, but may also be initiated by the user.

Figure 4:
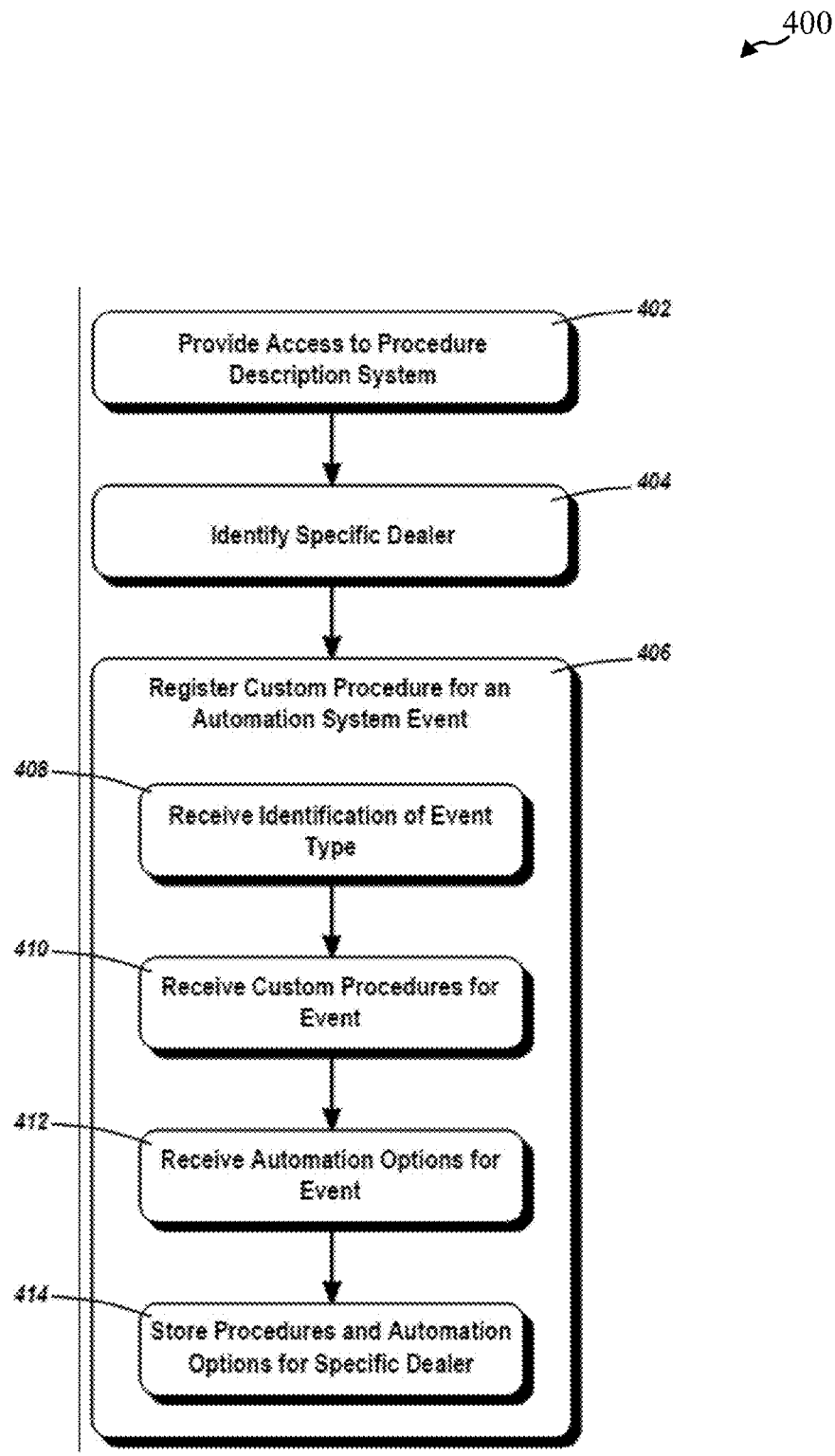
FIG. 4 illustrates an example method for a dealer or provider of automation services to register custom procedures to be used with customers or users, according to an embodiment of the present disclosure.

To implement the method 300 of FIG. 3, a NOC, control panel, data store, or other device may include information that describes potential events and the procedures associated with such events. In some embodiments, the information may be updated to change procedures, add new procedures, or even add information for different dealers. FIG. 4 illustrates an example method 400 for updating information on a dealer's specific follow-up or other procedures.

In the particular method 400 illustrated in FIG. 4, an act 402 may be included to provide access to a procedure description system. Such access may be provided to a dealer, an administrator of the procedure description system, or another entity. In some embodiments, providing access in act 402 may include acts such as such as making the procedure description system available online or offline, using login or other similar credentials to authenticate a user of the system, or other acts, or some combination thereof. The procedure description system may be hosted or available through any number of different devices or systems, including a NOC (e.g., NOC 120 of FIG. 1), remote data store (e.g., data store 127 of FIG. 1), server, or the like.

Upon providing or granting access to the procedure description system in act 402, the identity of a specific dealer can be identified in act 404. Where, for instance, a dealer is granted access to the procedure description system, the particular login or other credentials used for access may be used to also identify the dealer. Where an administrator of the procedure description system accesses the system, the administrator may specify a new or existing dealer in act 404. Following identification of the specific dealer in act 404, a custom procedure for an automation system event may be registered in step 406. The procedure registered may be specific to the identified dealer, thereby allowing a specific procedure to be followed, communicated, or made available to a customer (e.g., using the method 300 of FIG. 3).

In some embodiments, different acts may be taken to register a custom procedure for an automation system event in step 406. For instance, an identification of a type of event may be received in act 408. In effect, the act 408 may be used to determine what event type should be associated with a procedure. Thus, a low battery event, intruder alert event, false alarm event, water leak event, or other event may be identified. Such an event may be pre-existing and selected from a list of available events, or may be a new type of event first identified in act 408.

The step 406 for registering a custom procedure for an automation system event may also include receiving custom procedures for the event (act 410). As discussed herein, the procedures may relate to actions to be automatically taken by a control panel, NOC, or other device or system as an in-band response. Still other procedures may be follow-up procedures that the specific dealer would like to have followed. Such procedures may include procedures to be taken by the dealer, the NOC, or even the user of the automation system.

Optionally, automation options may also be provided for an event (act 412). As discussed herein, for instance, an automation option may be specified to allow automated scheduling of a service call, audio, video or text communication, or the like. More particularly, a specific dealer may, in one embodiment, want to allow a user to use a control panel of an automation system to schedule a service call and/or to communicate with a central service center when a particular event is identified. Any custom procedures and/or automation options may then be stored in act 414, and be identified as specific to the dealer identified in act 404.

Figure 5:
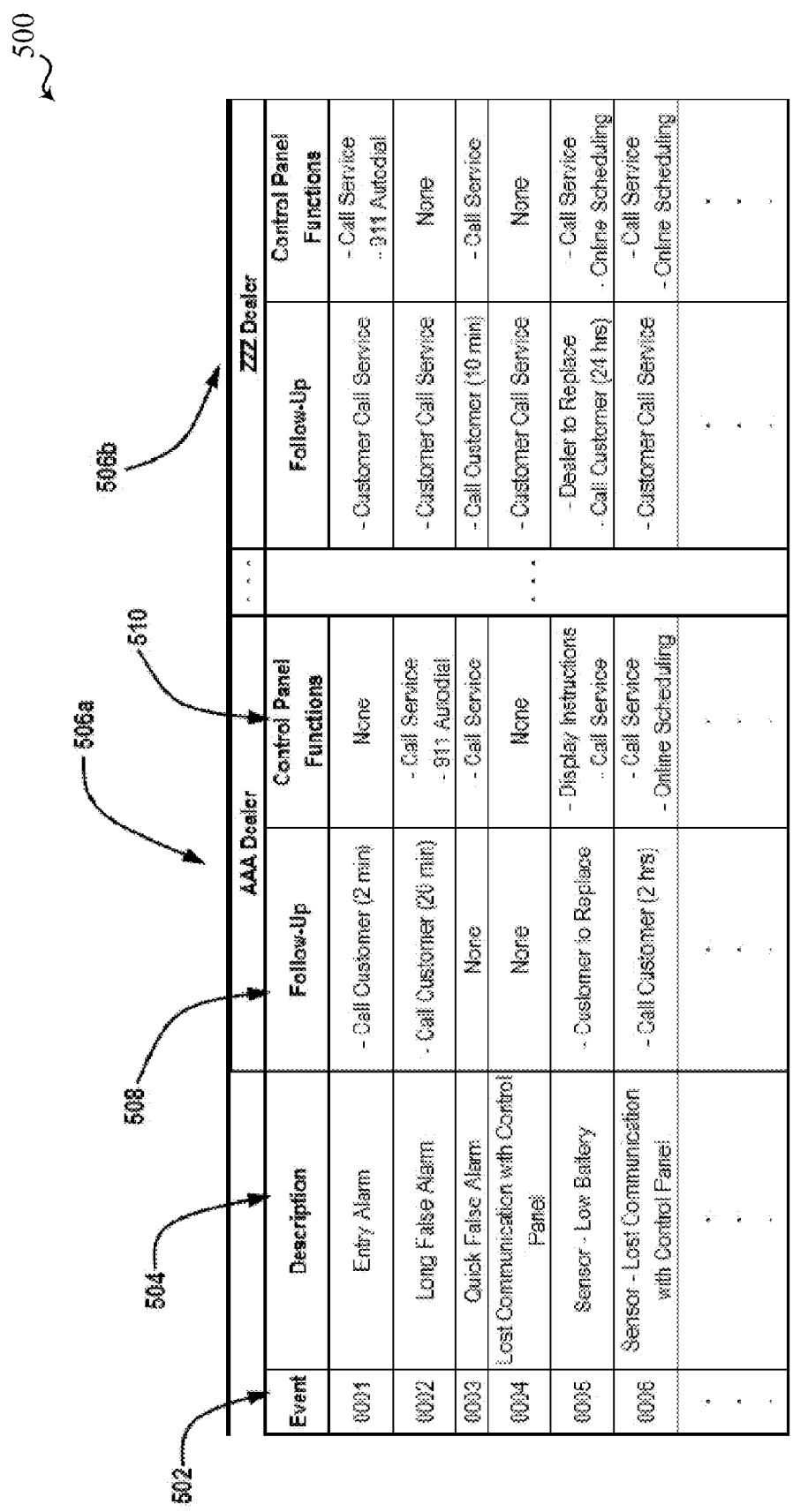
FIG. 5 depicts a table illustrative of an example data store for storing custom procedures for any of a number of different dealers or providers of automation services, according to another embodiment of the present disclosure.

Turning now to FIG. 5, a table 500 is illustrated to shown an example of a data store that may include information registered for use with automation systems sold or administered by a specific dealer. In the table 500, various events are identified in columns 502 and 504. Column 502 may, for instance, provide an identification code or number associated with an event while column 504 may describe the event. Each of various dealers may register particular types of procedures, options, and features to be associated with any or all of the events in columns 502 and 504.

In the particular embodiment illustrated in FIG. 5, the table identifies two dealers 506a, 506b, although any number of dealers may be included. As further shown in FIG. 5, each dealer may specify one or more follow-up procedures (column 508) that may be communicated to a user upon occurrence of the corresponding event (column 502). The first dealer 506a may, for instance, have registered different follow-up procedures than the second dealer 506b. In this particular embodiment, for instance, when an entry alarm event occurs, the first dealer 506a may have a procedure for calling the customer within 2 minutes to follow-up on the event. In contrast, the standard procedure for the second dealer 506b may be to have the customer call service. As discussed above with respect to at least FIG. 3, these procedures may also be communicated to the customer. Accordingly, when an entry alarm occurs, a customer of the first dealer 506a may receive a text message, email, or control panel audio or text message saying something to the effect of: "A breach of your security has been detected and the police have been notified. We will also call you within 2 minutes to see if you need additional assistance." In contrast, a similar message for the customer of the second dealer 506b may say "A breach of your security has been detected and the police have been notified. Please contact service at 1-888-555-1212 if you need additional assistance." Notably, in each case, the control panel, NOC or other component of an automation system may take other actions (e.g., call the police) in addition to, or instead of, notifying the customer of follow-up procedures. A description of what actions are taken actions may also be stored in the table 500, but may instead be stored in a separate data store or location.

The table 500 illustrates various types of follow-up procedures that may be specific to a particular dealer; however, such procedures are merely illustrative. In this particular embodiment, follow-up procedures may include follow-up calls that a dealer will make, or have a third party make, to the customer. Optionally, the call or message can be specified with a period of time (e.g., within 2 minutes, 10 minutes, 20 minutes, 2 hours, 24 hours, etc.). Still other procedures may be taken by the dealer or a third party, such as sending of email, text messages, or other communications. In another embodiment, a follow-up procedure may indicate that a dealer will take action such as performing a service call. For a low battery event, for instance, the second dealer 506b will replace the battery, and will call to set-up the service call to do so. Of course, these procedures may be communicated to the customer. In contrast, for the same type of event, the first dealer 506a may not have any follow-up action to take, but may instead indicate that the customer is expected to change the battery. The customer may thus be notified that he or she is expected to make the change. Still other follow-up procedures, such as requesting the customer to contact a service center, may be specified for communication to the customer.

As further reflected in table 500, a dealer may also enable optional functions of a control panel in response to an event. For instance, FIG. 5 illustrates a control panel functions column 510. Different options that are listed may correspond to different control panel features that may be selectively enabled in response to an event. For instance, in response to an event (e.g., alarm, false alarm, etc.), the control panel may be provided with an option to automatically call a service center through the control panel (i.e., "Call Service") option. Other options may allow for direct calling of emergency services (i.e., "911 Autodial"). Still other options may include an option to display certain instructions (i.e., "Display Instructions"), which may include instructions for replacing a battery in a sensor, resetting a system or component, or any other instructions for actions to be taken by a customer or user of an automation system. Other options may include an online scheduling option that can allow scheduling of a service call directly through the control panel. In some embodiments, the same options available through a control panel may be available through other sources as well (e.g., a computer, a control panel simulator app on a smart phone or tablet, etc.).

The table 500 of FIG. 5 is intended to be illustrative in all regards, and may have additional or other features, components, or arrangements. For instance, while events may be common to multiple dealers, each dealer may specify different events, such that a separate table 500 may be provided for each dealer, and a collection of tables used to initiate responses, provide information on follow-up procedures, implement event-specific control panel functions, and the like. Further, while the procedures and functions are illustrated in a basic form, they may be more complex. For instance, procedures and/or functions for an event may include functions or logic (e.g., Boolean logic). Thus, how a control panel, NOC, or other system or component responds or acts may vary in complexity according to not only the events that occur, but on how those responses are described or scripted.

As described herein, the table 500 may generally represent a data store that can be used by a NOC, central service center, or other location to respond to events and provide a customer with specific information about follow-up and other procedures for the customer's dealer or service provider. In some embodiments, the dealer itself may provide such a service, and may thus use a table 500 including only its own procedures and protocols. In other embodiments, however, a NOC may be used by multiple, different dealers. Where multiple dealers are used, an identification of a control panel communicating with the NOC may potentially be associated with a particular dealer. Consequently, when the control panel and NOC communicate, the control panel identification may be used to identify the corresponding dealer, and thus the corresponding protocols and functions to be used and communicated.

Of course, as described herein, a NOC or other external resource may not be used, and a control panel itself may access a remote or local copy of the table 500 or another suitable data store. In one embodiment, upon changing, creating, deleting, or otherwise modifying procedures for a specific dealer, a central location may push an update to a control panel. Such update may include only information for the specific dealer; however, in other embodiments the update may include information for multiple dealers.

Figure 6:
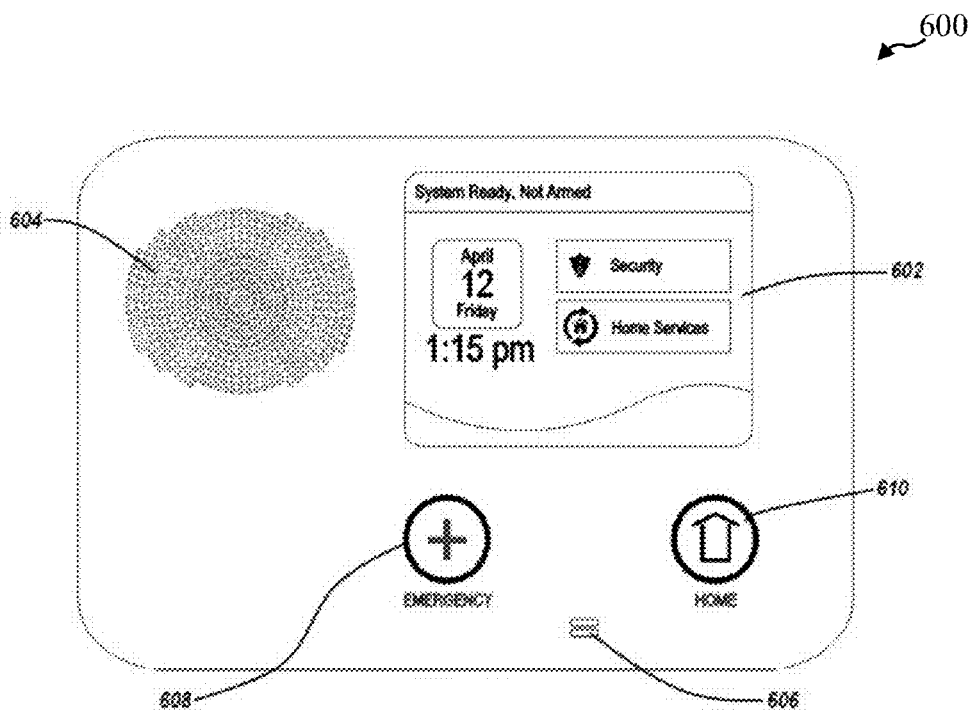
FIGS. 6-8 illustrate an example control panel usable in detecting an event and displaying information based on procedures customized for a dealer or provider of automation services, according to an embodiment of the present disclosure.

To provide a more complete understanding of some embodiments in which aspects of the present disclosure may be used, reference is now made to FIGS. 6-14 which illustrate an example control panel 600. The illustrated control panel 600 may generally represent an example of a control panel that may be used in connection with systems, methods, and devices of the present disclosure. For example, control panel 600 may include one or more aspects of control panel 200 described above in reference to FIG. 2. In some embodiments, the control panel 600 may therefore be used to access or receive dealer-specific protocols, and to communicate those protocols to a user. In FIG. 6, for instance, the control panel 600 is shown as including a display 602, speaker 604, microphone 606, and input devices 608, 610. The display 602 may provide text, images, video, and other information that may be visually depicted to the customer. The speaker 604 may provide information to be audibly conveyed to the customer. Examples of such information may include alarms or alerts; however, other information may also be provided. For instance, the control panel 600 may be used to receive audible messages from a service center, and potentially to engage in two-way communication. Thus, the microphone 606 may receive audio information and pass it to a representative at a service center, a caller on a phone line, a person in another room through an intercom, or the like.

The illustrated input devices 608, 610 generally represent any of various other types of inputs that may be used to interact with the control panel 600. Input device 608 may, for instance, be a button used to initiate an emergency call. Such a call may be placed to a response center for the dealer of the control panel, or to a local police, security, fire department, or other emergency response location. The input device 610 is illustrated as a "home" button. In some embodiments, the display 602 may include different interfaces or screens, and the home option may be used to return to a so-called home or initial screen. In other embodiments, other types of input/output devices may also be provided as discussed herein. Examples of other input devices may include keypads, sensors, and ports. In some embodiments, the display 602 may also act as an input device, such as where the display 602 is touch-sensitive.

As discussed herein, the control panel 600 may interface with, or be part of, an automation system that includes one or more automation components. Examples of different types of automaton components are described herein, and can include security components, lighting components, HVAC components, and the like. Optionally, the control panel 600 monitors such automation components and detects events that occur.

Figure 7:
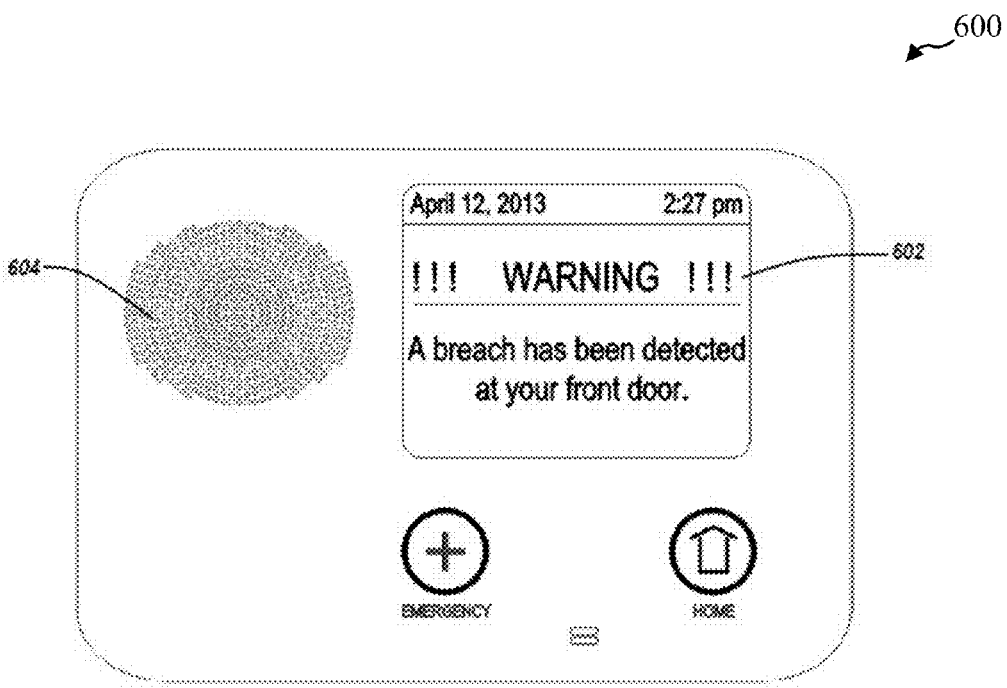

According to at least some embodiments, the control panel 600 may communicate with one or more automation components of a security system (e.g., security system 114 of FIG. 1). FIG. 7 illustrates the control panel 600 in an example embodiment following detection of an event by a security system component. In this particular embodiment, the component may have detected a breach at a particular location (e.g., a front door to a building). In response, the control panel may use the display 602 to notify a user of the event. Optionally, the speaker 604 may be used to sound an alarm, or other actions may be taken.

Figure 8:

In accordance with one embodiment, the control panel may also be used to determine follow-up or other procedures specific to the dealer providing the control panel 600, and to communicate such information available to the customer. As an example, the control panel 600 may automatically access a data store and identify dealer-specific procedures and/or communicate with a NOC to obtain such procedures. In response, the procedures may be communicated to the customer. FIG. 8, for instance, illustrates the control panel 600 after obtaining dealer-specific procedures in accordance with one embodiment. In this particular embodiment, a response may be initiated (e.g., calling the police), and potentially communicated by displaying information on the display 602. The dealer may also take other actions to follow-up on the event. For instance, the dealer may have a procedure to have a service representative call to make sure everything is okay with the customer. In FIG. 8, the display 602 also indicates that a call will be made to the customer to check on them. While such information is shown on the display 602, it may also be provided in additional or other manners, including through the speaker 604. The control panel 600 and/or a NOC or other component may also send information to other devices, including to electronic devices such as computing devices, tablet devices, and mobile phones.

Figure 9:
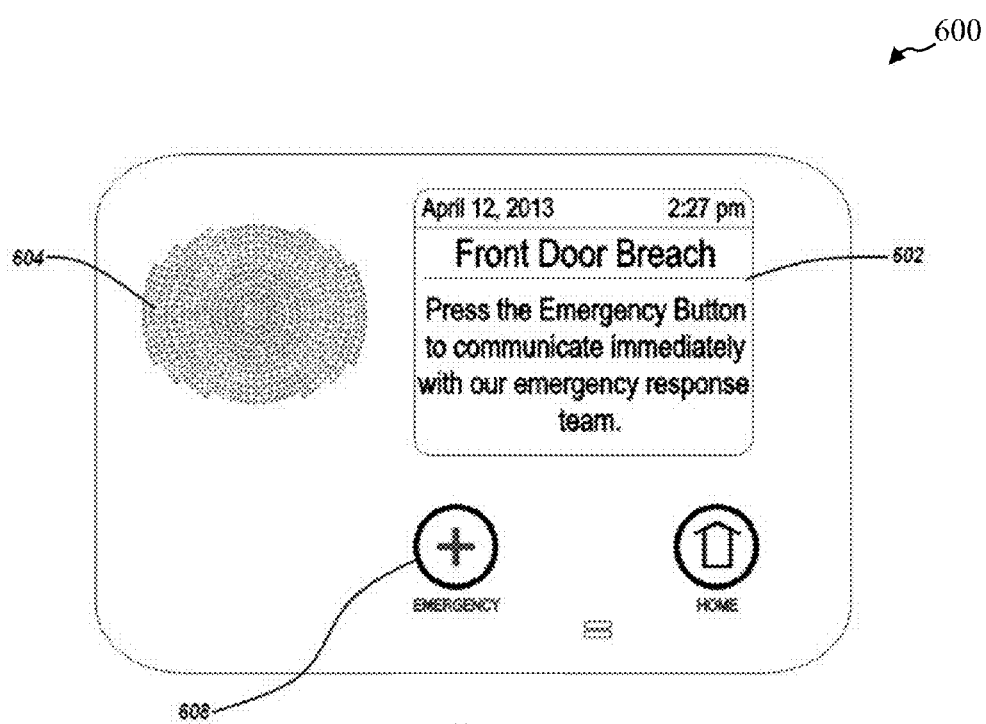
FIG. 9 illustrates an example control panel usable in coordinating specific action in response to an event and custom procedures of the control panel of FIGS. 6-8.

In addition to notifying the customer of follow-up procedures that will be taken by the dealer, and/or what responses have already been taken, the control panel 600 may also facilitate other actions to be taken by the customer. FIG. 9, for instance, illustrates an embodiment in which the display 602 is used to instruct a customer to press the input device 608 if additional assistance is needed. In this particular embodiment, pressing the input device 608 may direct a customer to the dealer's emergency response team. Such an option may be the standard use of the input device 608, and the information on the display 602 may include standard instructions for how to use the input device 608. In other embodiments however, the function of the input device 608 may be changed or overridden. As an example, the input device 608 could normally initiate communication with a dealer's emergency response or service team, but upon an event such as a smoke alarm, the emergency button or other input device 608 may instead route contact to a fire department or other local emergency center.

Figure 10:
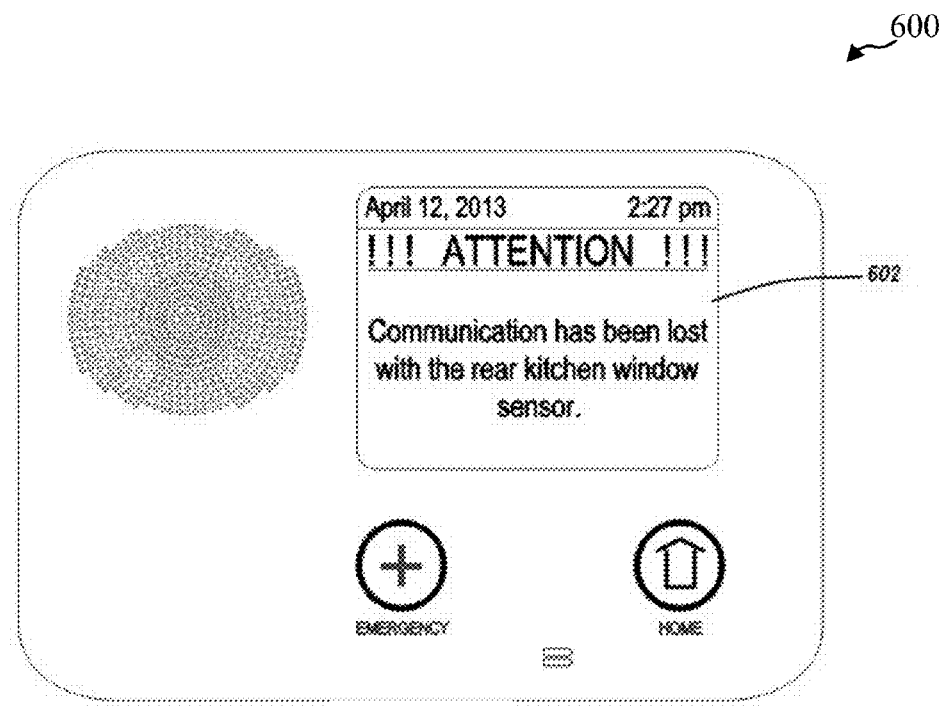
FIGS. 10 and 11 illustrate another example control panel usable in detecting an event and displaying information based on procedures customized for a dealer or provider of automation services, according to an embodiment of the present disclosure.
Figure 11:
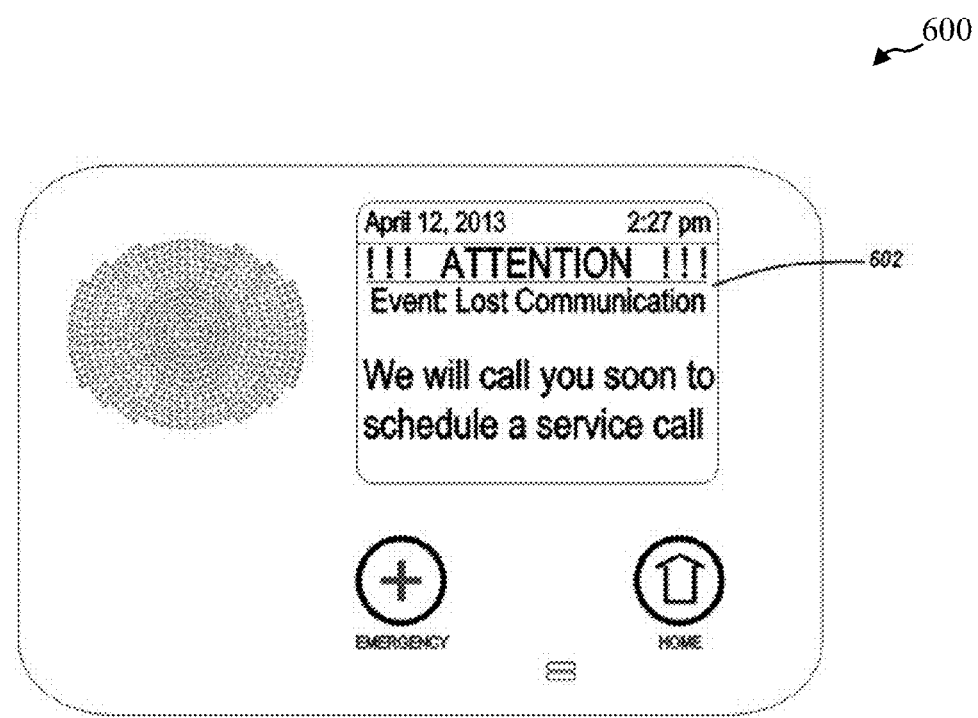

FIGS. 10-14 illustrate still additional embodiments of the control panel 600 in additional examples that may further illustrate some aspects of the present disclosure. In particular, the control panel 600 of FIG. 10 may detect a problem with an automation component, or communication with an automation component. The problem may be logged as an event and used to identify specific procedures the dealer may have for responding to the event. Optionally, the event itself may also be reported using the control panel. FIG. 10, for instance, displays information about the event on the display device 602.

Upon receipt of dealer-specific procedures from a remote (e.g., a NOC) or local (e.g., internal storage) source, the dealer-specific procedures can be identified and communicated to the user. Thus, in FIG. 11, the control panel 600 may access or receive information indicating that the dealer's standard procedures for a loss of communication is to schedule a service call where the dealer can check it out. Additional procedures may indicate that the dealer will initiate a phone call or other communication to schedule the call. These procedures may then be communicated to the customer (e.g., using the display device 602).

Figure 12:
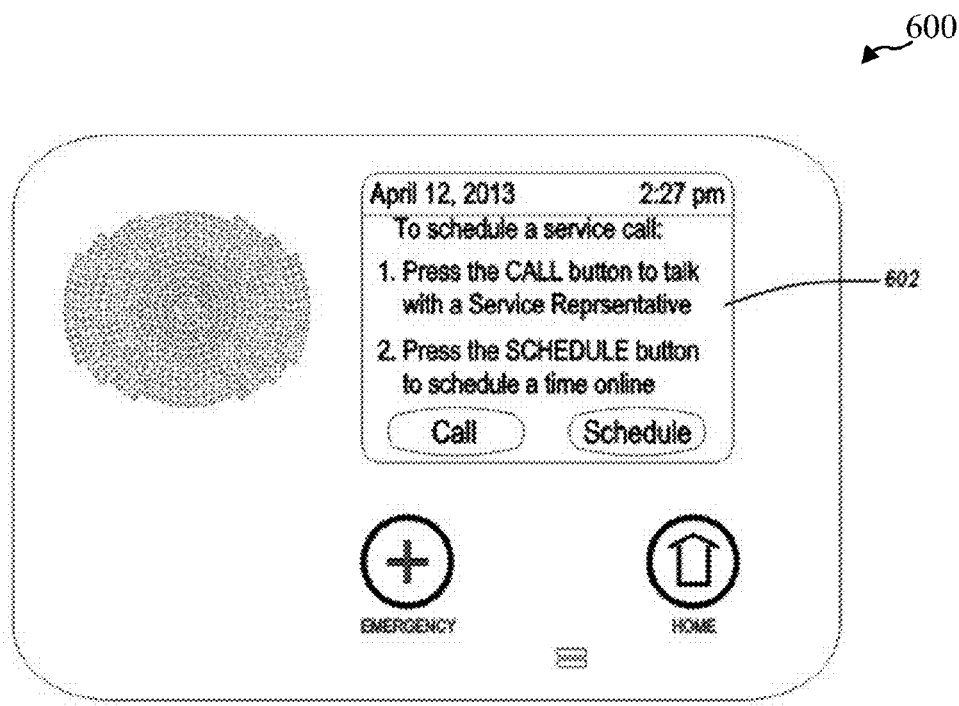
FIGS. 12-14 an example control panel usable in coordinating specific actions in response to an event, and based on custom procedures of a dealer or provider, using the control panel of FIGS. 10 and 11.

Optionally, additional functionality may be enabled or facilitated by accessing dealer-specific information. FIG. 12, for instance, illustrates an example in which the control panel 602 may be used to allow the customer to schedule the service call. Such functionality is optionally embedded in the operating system or application programs of the control panel 600. Upon identifying the dealer's procedure to perform a service call to remedy an event, the functionality may be enabled. In other embodiments, the option may always be enabled, and the control panel 600 may simply direct the user to the appropriate interface to facilitate its use.

In the particular embodiment illustrated in FIG. 12, the control panel 600 may display information to allow a user to schedule a service call using either of two methods. For instance, a user may select a "call" option to initiate a voice and/or video call with a service representative. The display 602 may include touch screen capabilities to allow the user to select a corresponding "call" button to initiate the call. Alternatively, the user may schedule the service call through the control panel 600 (or smart phone application, browser, etc.), by selecting a "schedule" button.

Figure 13:
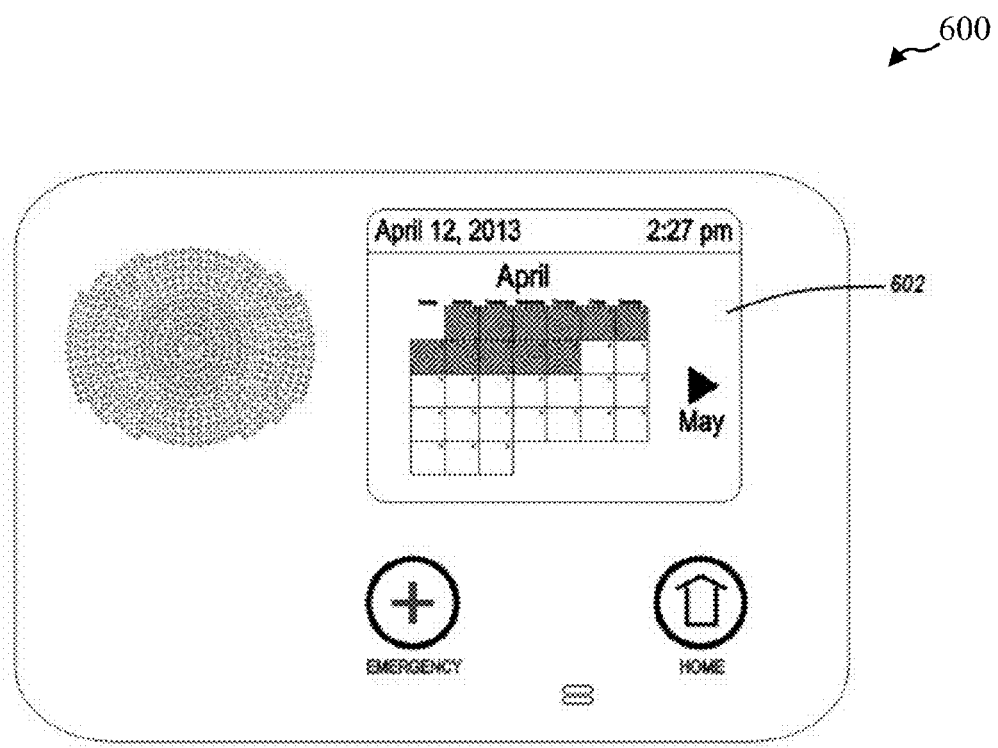
Figure 14:
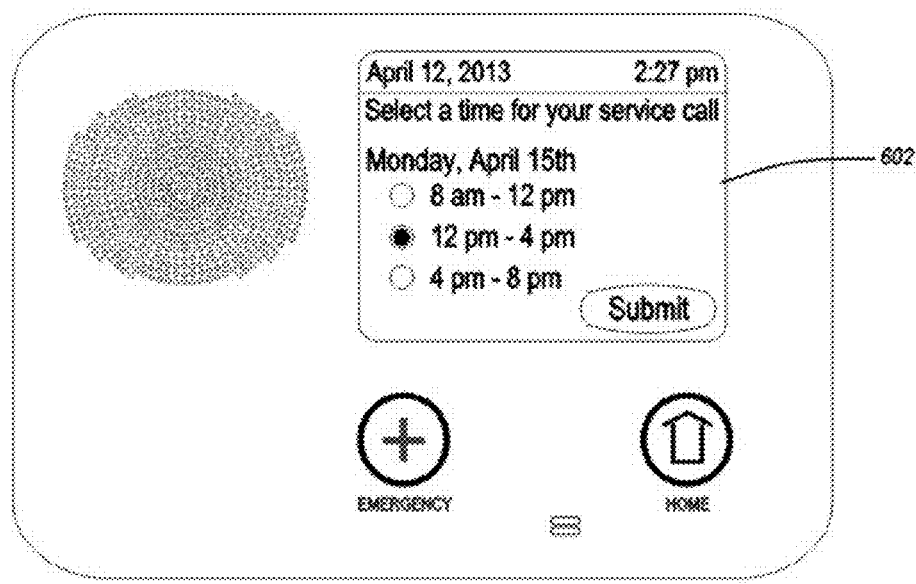

FIGS. 12 and 13 illustrate one manner in which the scheduling option may be used. As an example, upon selecting an option to schedule a service call through the control panel 600, the display 602 may present a calendar or other similar option showing days available to schedule the call. Optionally, the control panel 600 may communicate with a service center, NOC, or other location to obtain information on which days are available for the service call. Upon selection of a day (e.g., by touching the day on the touch screen display 602 of FIG. 13), the service center, NOC, or other location can be notified and the service call scheduled. In some embodiments, however, a user may be able to schedule a time during the day for the service call to occur. FIG. 14, for instance, illustrates an example in which the user has selected April 15th for a service call. The user can then select any of the available times, and then press the "Submit" option to schedule the service call. Optionally, once scheduled, the control panel 600, NOC, a service center, or other component or system may send a text message, calendar item, email, or other notification to the customer.

While FIGS. 6-14 illustrate example embodiments in which a control panel 600 may be used to carry out particular acts, or communication certain information, such embodiments are merely illustrative. As an example, dealer specific information may be communicated to a customer without using the control panel. For instance, a control panel may be used to sense an event in the automation system and communicate the information to a NOC or other location. The NOC can determine what dealer provided the control panel and what specific procedures, including follow-up procedures, the dealer has registered. The NOC may send a text, email, or other message to an electronic device to provide information that could alternatively, or additionally, be sent to the control panel.

Figure 15:
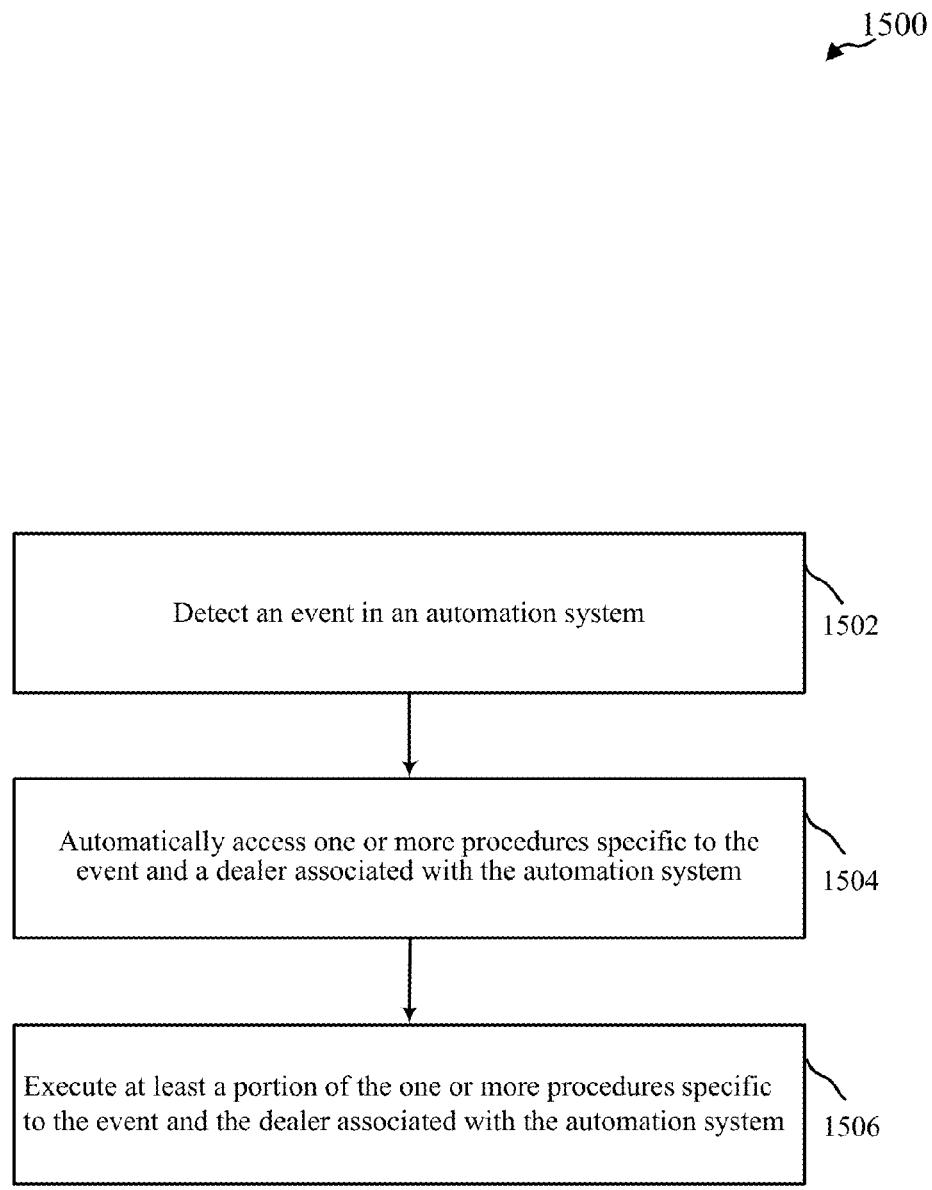
FIGS. 15-16 illustrate example flow diagrams of methods for providing an automation system user with custom procedures in response to an event of the automation system, according to embodiments of the present disclosure.

In reference now to FIG. 15, a method 1500 is shown for providing an automation system user with one or more procedures in response to an event of the automation system, as described herein. The method 1500 may include one or more aspects of method 300 described above in reference to FIG. 3, and may be implemented by one or more of an NOC 120 of FIG. 1, a control panel, such as control panels 200 and/or 600 of FIGS. 2 and 6-14, any other automation system components, and/or one or more user devices 124, 126. Furthermore, method 1500 may utilize information related to one or more procedures, for example from table 500 described in reference to FIG. 5, one or more local data stores, and/or one or more remote data stores (e.g. data store 127). The method 1500 may also be implemented with one or more aspects of methods 300 and/or 400 of FIGS. 3 and/or 4.

In one aspect, method 1500 may include detecting an event in an automation system at act 1502. The automation system may include one or more automation components that are communicatively linked to a control panel. The one or more automation components may detect an event, such as a door opening, the presence of smoke, etc., and may communicate an indication of the event to the control panel, which may in turn in some embodiments, communicate the indication to the NOC.

At act 1504, one or more procedures specific to the event and a dealer associated with the automation system may be automatically accessed, for example from a local or remote data store, such as from table 500 of FIG. 5.

At act 1506, at least a portion of the one or more procedures specific to the event and the dealer associated with the automation system may be executed, as described in detail above. Executing the one or more procedures, for example, may include sending and/or displaying information on a control panel of the automation system, calling an emergency responder (e.g., police, fire, etc.), etc.

Figure 16:
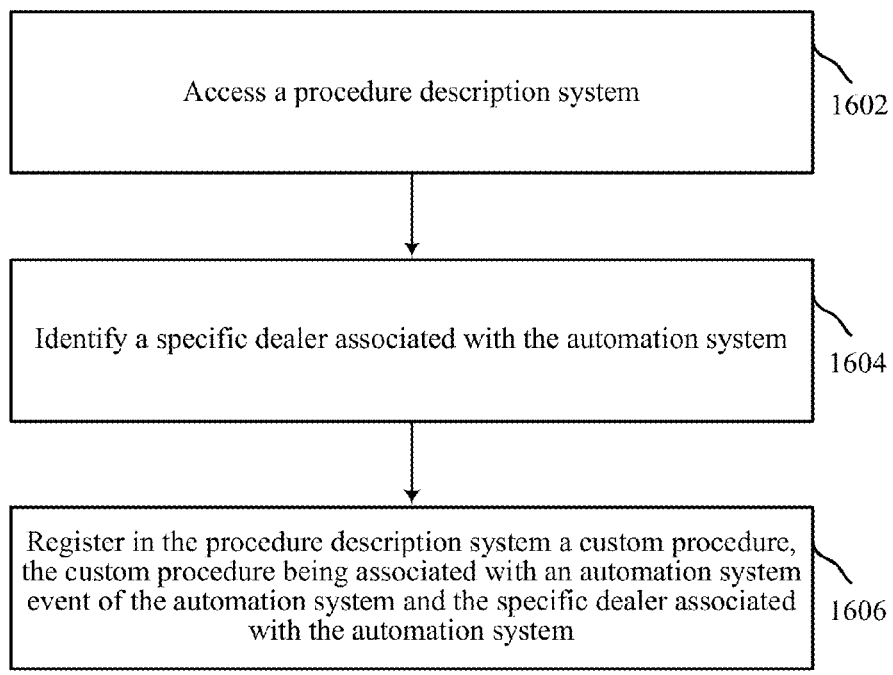

In reference now to FIG. 16, a method 1600 is shown for providing registration of custom procedures in response to one or more events detected in an automation system, as described herein. The method 1600 may include one or more aspects of method 400 described above in reference to FIG. 4, and may be implemented by one or more of an NOC 120 of FIG. 1, a control panel, such as control panels 200 and/or 600 of FIGS. 2 and 6-14, any other automation system components, and/or one or more user devices 124, 126. Furthermore, method 1600 may utilize and/or access information related to one or more procedures, for example from table 500 described in reference to FIG. 5, one or more local data stores, and/or one or more remote data stores (e.g. data store 127). The method 1600 may also be implemented with one or more aspects of methods 300, 400, and/or 1500 of FIGS. 3, 4, and/or 15.

In one aspect, method 1600 may include accessing a procedure description system at act 1602. The method 1600 may further include identifying a specific dealer associated with the automation system at act 1604. At act 1606, method 1600 may also include registering in the procedure description system a custom procedure, the custom procedure being associated with an automation system event of the automation system and the specific dealer associated with the automation system. In some cases, acts 1602-1606 may be performed in conjunction with table 500 described above in reference to FIG. 5. For example, table 500 may be accessed at act 1602. Next a dealer associated with the automation system may be identified at act 1604 and located in the table via the dealer field 506. Registering the procedure at act 1606 may include creating or modifying an existing row in table 500, such that the custom producer is entered in the follow-up and/or control panel functions fields 508, 510, associated with an event via an event ID 502 and/or an event description 504. In this way, custom procedures may be entered and stored in a data store, such as table 500 of FIG. 5, to allow future events occurring at the automation system to prompt action according to the custom procedures.

Embodiments of the present disclosure may comprise or utilize a special purpose or general-purpose computer including computer hardware, such as, for example, one or more processors and system memory. Embodiments within the scope of the present disclosure also include physical and other non-transitory computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media. Computer-readable media that includes computer-executable instructions may also be referred to as a computer program product.

Examples of computer storage media include RAM, ROM, EEPROM, CD-ROM or other optical disk storage, magnetic disk storage or other magnetic storage devices, flash-based storage, solid-state storage, or any other physical, non-transmission medium which can be used to store desired program code means in the form of computer-executable instructions or data structures and which can be accessed by a general purpose or special purpose computer.

When information is transferred or provided over a communication network or another communications connection (either hardwired, wireless, or a combination of hardwired or wireless) to a computing device, the computing device properly views the connection as a transmission medium. A "communication network" may generally be defined as one or more data links that enable the transport of electronic data between computer systems and/or modules, engines, and/or other electronic devices, and transmissions media can include a communication network and/or data links, carrier waves, wireless signals, and the like, which can be used to carry desired program or template code means or instructions in the form of computer-executable instructions or data structures within, to or from a communication network. Combinations of storage media and transmission media should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, dedicated or special purpose computer (e.g., an automation system control panel), or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, automation system control panels, network operations centers, mainframe computers, mobile telephones, PDAs, pagers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose, dedicated or other computing devices integrated within or particular to a particular residence, business, company, government agency, or other entity, and that such devices may operate using one or more network, wireless, hardwire, or other connections, or any combination thereof. Examples may include residential or commercial buildings in connection with security or other automation systems configured to monitor local conditions (i.e., within a specific range of the building), remote conditions (i.e., accessible regardless whether within a particular range), or some combination thereof.

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. Any feature illustrated or described relative to one embodiment is interchangeable and/or may be employed in combination with features of any other embodiment herein. In addition, other embodiments may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A method for communicating dealer-specific procedures to a user of an automation system, comprising:

in a home automation system comprising one or more automation components communicatively linked to a control panel, detecting an event in the home automation system;

upon detecting the event, automatically accessing from a data store containing a plurality of dealer-specific procedures comprising at least a first procedure specific to the event and set up by a first dealer associated with the home automation system and a second procedure specific to the event and set up by a second dealer associated with the home automation system and different from the first dealer, one or more of the first procedure and the second procedure, the accessed procedure(s) being selectively enabled, and the first dealer and the second dealer being different from a monitoring service of the automation system and an end consumer of the automation system; and executing at least a portion of the accessed procedure(s) specific to the event, wherein executing the at least a portion of the accessed procedure(s) comprises in response to the event, automating the at least a portion of the accessed procedure(s) specific to the event.

2. The method recited in claim 1, wherein executing the at least a portion of the accessed procedure(s) comprises communicating the procedure(s) to the user of the home automation system using the control panel.

3. The method recited in claim 1, wherein automating the at least a portion of the accessed procedure(s) comprises automating the at least a portion of the accessed procedure(s) in response to receiving a user input.

4. The method recited in claim 1, further comprising identifying the dealer associated with the home automation system.

5. The method recited in claim 1, wherein the data store comprises a remote data store, and wherein accessing one or more of the first procedure and the second procedure specific to the event comprises:

sending event information to a remote system comprising the remote data store; and receiving from the remote data store of the remote system the one or more of the first procedure and the second procedure.

6. The method recited in claim 5, wherein sending the event information to the remote system comprises sending an event identification to a network operations center.

7. The method recited in claim 1, wherein the data store comprises a local store, and accessing one or more of the first procedure and the second procedure specific to the event comprises accessing one or more of the first procedure and the second procedure from the local data store.

8. The method recited in claim 2, wherein communicating the accessed procedure(s) to the user comprises displaying the accessed procedure(s) on a display device of the home automation system.

9. The method recited in claim 1, wherein accessing one or more of the first procedure and the second procedure comprises accessing one or more follow-up procedures, the one or more follow-up procedures comprising at least one of:

an action to be taken by a network operations center;
an action to be taken by the dealer;
an action to be taken by the user; or
at least one out-of-band procedure.

10. The method recited in claim 1, wherein accessing one or more of the first procedure and the second procedure comprises accessing one or more control panel functions specific to at least one of the first dealer and the second dealer for a particular event.

11. The method of claim 10, further comprising facilitating the one or more control panel functions specific to at least one of the first dealer and the second dealer for the particular event, wherein facilitating the one or more control panel functions specific to the dealer for the particular event comprises presenting one or more interfaces using the control panel, the one or more interfaces enabling:

initiation of at least voice communication with the dealer;
initiation of at least voice communication with a network operations center;
initiation of at least voice communication with an emergency response location;
electronic scheduling of a service call; or
display of instructions for performing a user-implemented procedure specific to the event and the dealer associated with the home automation system.

12. A method for registering dealer-specific procedures associated with events in a home automation system of a user, comprising:

accessing a procedure description system comprising a plurality of custom procedures of dealers associated with home automation systems, including at least a first procedure specific to a home automation system event and set up by a first dealer and a second procedure specific to the home automation system event and different from the first procedure set up by a second dealer different from the first dealer;

identifying a specific dealer associated with the home automation system, the specific dealer being different from a monitoring service of the home automation system and an end consumer of the home automation system; and registering, by the specific dealer, in the procedure description system a custom procedure, the custom procedure being associated with the home automation system event of the home automation system and the specific dealer associated with the home automation system.

13. The method recited in claim 12, wherein registering in the procedure description system the custom procedure comprises:

identifying the home automation system event;
receiving a custom procedure associated with the home automation system event; and
storing the custom procedure in association with an identification of the home automation system event.

14. The method recited in claim 12, wherein registering in the procedure description system the custom procedure comprises registering an out-of-band follow-up procedure for the specific dealer and specific to the home automation system event.

15. The method recited in claim 12, wherein registering in the procedure description system the custom procedure comprises registering an automation option for the specific dealer and specific to the home automation system event, and wherein the specific dealer is different from the first dealer and the second dealer.

16. A control panel of a home automation system, comprising:
one or more processors;
a display device; and
non-transitory computer-readable media storing computer-executable instructions that, when executed by the one or more processors, cause the control panel to:
detect an event at an automation component of the home automation system;
access one or more dealer-specific procedures specific to the event, of a plurality of dealer-specific procedures comprising at least a first procedure set up by a first dealer associated with the home automation system and a second procedure set up by a second dealer associated with home automation system, the second dealer being different from the first dealer, wherein the accessed one more dealer-specific procedures comprises at least one of the first procedure and the second procedure; and
display on the display device the accessed one or more dealer-specific procedures for the event;
wherein the first dealer and the second dealer are different from a monitoring service of the home automation system and an end consumer of the home automation system.

17. The control panel recited in claim 16, wherein the non-transitory computer readable media further store computer-executable instructions that, when executed, cause the control panel to display on the display device the one or more dealer-specific procedures specific to the event.

18. The control panel recited in claim 16, wherein the one or more dealer-specific procedures specific to the event comprises one or more follow-up procedures, the one or more follow up procedures comprising at least one of:
identifying a future action by a dealer associated with the home automation system;
identifying a future action by a network operations center communicatively linked to the control panel;
identifying a future action to be taken by a user of the control panel; or
at least one out-of-band procedure.

19. The control panel recited in claim 16, wherein the non-transitory computer-readable media further store computer-executable instructions that, when executed by the one or more processors, cause the control panel to:
display a service call scheduling interface;
receive a user selection, through the service call interface, of service call scheduling information; and
communicate the received service call scheduling information to a service center.

* * * * *